(12) United States Patent
Caleman

(10) Patent No.: US 11,383,908 B2
(45) Date of Patent: Jul. 12, 2022

(54) TAMPER-EVIDENT RECLOSABLE PACKAGES

(71) Applicant: Bemis Company, Inc., Neenah, WI (US)

(72) Inventor: Reinaldo Caleman, Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 601 days.

(21) Appl. No.: 16/339,637

(22) PCT Filed: Oct. 10, 2016

(86) PCT No.: PCT/US2016/056221
§ 371 (c)(1),
(2) Date: Apr. 4, 2019

(87) PCT Pub. No.: WO2018/070975
PCT Pub. Date: Apr. 19, 2018

(65) Prior Publication Data
US 2020/0047963 A1    Feb. 13, 2020

(51) Int. Cl.
*B65D 75/58* (2006.01)
*G09F 3/00* (2006.01)
*B65D 77/20* (2006.01)

(52) U.S. Cl.
CPC ..... *B65D 75/5838* (2013.01); *B65D 75/5855* (2013.01); *G09F 3/0292* (2013.01); *B65D 77/204* (2013.01); *B65D 2577/205* (2013.01)

(58) Field of Classification Search
CPC ............ B65D 43/0235; B65D 75/5838; B65D 75/5855; B65D 77/206; B65D 77/204; B65D 5722/205; G09F 3/0292

USPC ................ 220/214, 397; 229/237; 383/5, 66
See application file for complete search history.

(56) References Cited

U.S. PATENT DOCUMENTS

| | | | |
|---|---|---|---|
| 4,320,158 A | | 3/1982 | Seeley |
| 4,679,693 A | * | 7/1987 | Forman .............. B65D 75/5838 383/203 |
| 4,706,875 A | * | 11/1987 | Blackman .............. B65D 5/701 229/125 |
| 4,723,301 A | | 2/1988 | Chang |
| 5,716,688 A | | 2/1998 | Burke et al. |
| 6,309,105 B1 | | 10/2001 | Palumbo |
| 6,428,867 B1 | * | 8/2002 | Scott ....................... B32B 27/08 206/807 |

(Continued)

FOREIGN PATENT DOCUMENTS

| | | |
|---|---|---|
| AU | 664819 | 11/1995 |
| WO | 2016060846 A1 | 4/2016 |

*Primary Examiner* — Chun Hoi Cheung

(57) ABSTRACT

The present invention is directed to packages having a peelable/resealable tamper-evident label adhesively sealed to the portion of packaging body with a line of weakness. The peelable/resealable tamper-evident label comprises an unsealed pull tab and a plurality of adjacent tear slits positioned at or near the periphery of the peelable/resealable tamper-evident label. The tear slits are slanted towards the unsealed pull tab. The packages provide evidence of tampering when one Improperly attempts to open the package by removing the label at a corner or a side of the label. When the label is lifted anywhere other than the unsealed pull tab, it will tear at one or more tear slits which indicates that the label has been tampered with.

14 Claims, 8 Drawing Sheets

(56) References Cited

U.S. PATENT DOCUMENTS

| | | | |
|---|---|---|---|
| 6,616,334 B2* | 9/2003 | Faaborg | B65D 75/5855 |
| | | | 383/203 |
| 6,918,532 B2* | 7/2005 | Sierra-Gomez | B65D 77/003 |
| | | | 229/87.08 |
| 7,007,423 B2* | 3/2006 | Andersson | B65D 75/5838 |
| | | | 206/1.5 |
| 7,371,008 B2* | 5/2008 | Bonenfant | B65D 75/5838 |
| | | | 383/5 |
| 7,681,732 B2 | 3/2010 | Moehlenbrock et al. | |
| 8,114,451 B2* | 2/2012 | Sierra-Gomez | B65D 75/5838 |
| | | | 426/87 |
| 9,150,342 B2 | 10/2015 | Sierra-Gomez et al. | |
| 9,278,783 B2 | 3/2016 | Emmott | |
| 9,422,080 B2 | 8/2016 | Tinoco et al. | |
| 10,118,741 B2* | 11/2018 | Lyzenga | B65D 75/5838 |
| 11,021,305 B2* | 6/2021 | Huffer | B65D 5/542 |
| 11,027,892 B2* | 6/2021 | Lyzenga | B65D 43/0235 |
| 2004/0112010 A1* | 6/2004 | Richards | B65D 75/18 |
| | | | 53/415 |
| 2006/0171611 A1* | 8/2006 | Rapparini | B65D 75/5838 |
| | | | 383/66 |
| 2006/0255054 A1* | 11/2006 | Vovan | B65D 77/2056 |
| | | | 220/793 |
| 2007/0275133 A1* | 11/2007 | Sierra-Gomez | B65D 75/44 |
| | | | 426/122 |
| 2008/0037911 A1* | 2/2008 | Cole | B65D 75/522 |
| | | | 383/203 |
| 2008/0156861 A1 | 7/2008 | Sierra-Gomez et al. | |
| 2008/0240627 A1* | 10/2008 | Cole | B65D 77/2096 |
| | | | 383/204 |
| 2009/0301903 A1* | 12/2009 | Andersson | B65D 75/5833 |
| | | | 206/215 |
| 2010/0002963 A1 | 1/2010 | Holbert et al. | |
| 2010/0018974 A1 | 1/2010 | Lyzenga et al. | |
| 2011/0126439 A1 | 6/2011 | Liu et al. | |
| 2013/0004626 A1* | 1/2013 | Renders | B65D 33/02 |
| | | | 426/121 |
| 2013/0011527 A1* | 1/2013 | Renders | B65D 75/5838 |
| | | | 426/124 |
| 2014/0000219 A1 | 1/2014 | Pezzoli | |
| 2017/0073136 A1 | 3/2017 | Konicke | |

* cited by examiner

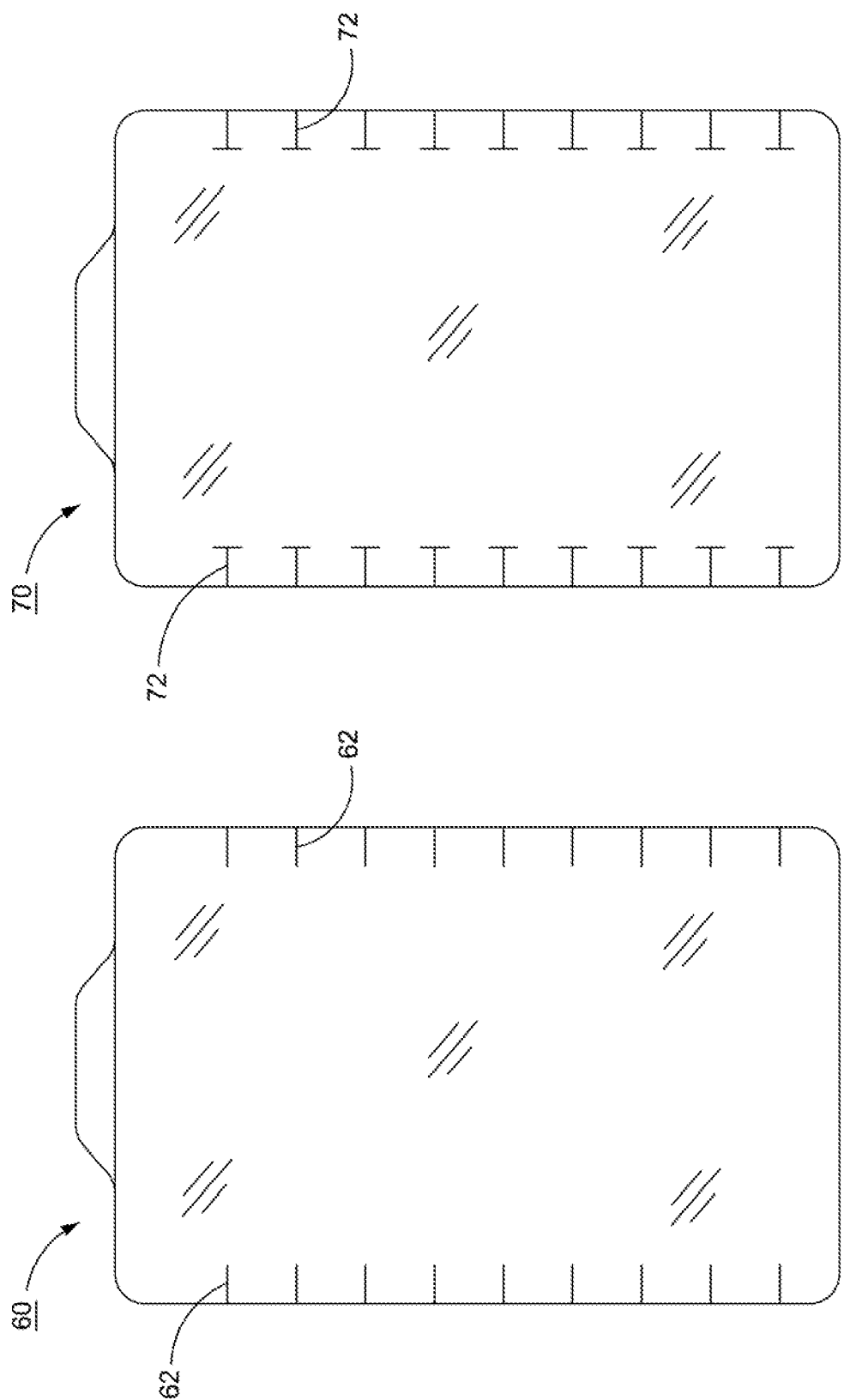

TAMPER-EVIDENT RECLOSABLE PACKAGES

BACKGROUND OF THE INVENTION

The present invention relates generally to primary packaging, and in particular to packages having a tamper-evident peelable/resealable label.

The following description of the background and embodiments of the invention thereafter is provided to aid in understanding the invention, but is not admitted to describe or constitute prior art to the invention. The contents of the articles, patents, and patent applications, and all other documents and electronically available information mentioned or cited in this application, are hereby incorporated by reference in their entirety to the same extent as if each individual publication was specifically and individually indicated to be incorporated by reference, including any references cited in the articles, patents, patent applications and documents cited herein, except to the extent they may directly contradict the present disclosure. Applicant reserves the right to physically incorporate into this application any and all materials and information from any such articles, patents, patent applications, or other documents The use of labels for accessing and/or repeatedly accessing the contents of a package are known. For example, U.S. Pat. No. 4,679,693 (Forman) discloses a resealable container with a tearable face opened and resealed by a label. The label includes multiple layers and, for tamper evidence, requires that an end-user remove a layer covering or overlaying a pull tab in order to access a label to open the package.

Other forms tamper-evidence have been integrated into the packaging films. For example, U.S. Pat. No. 7,681,732 (Moehlenbrock et al.) discloses a laminated lidstock including a substrate film, a support film, a pressure sensitive adhesive disposed between the substrate and support films, a first die cut in the substrate film, a second die cut in the support film, a pull tab and a tamper evidence device. To open the package, the tamper evidence device, i.e., a first end portion of the support film must be removed from the substrate film in order to access the pull tab which then can be used to peel back the support film. The tamper evidence is indicated when printed indicia is revealed upon removal of the end portion of the support film from the substrate film. The package requires printing indicia in registration onto the surface of the substrate film. This package does not include a label.

SUMMARY OF THE INVENTION

Embodiments of the present invention are directed to packages comprising a package body having a top portion, a bottom portion and side portions connecting the bottom portion to the top portion; and a line of weakness in a portion of the package body. The packages include a peelable/resealable tamper-evident label adhesively sealed to the portion of packaging body having the line of weakness. The peelable/resealable tamper-evident label comprises an unsealed pull tab and a plurality of adjacent tear slits positioned at or near the periphery of the peelable/resealable tamper-evident label. It should be understood that the tear slits are positioned at the periphery of the label where the label is not intended to be properly removed, i.e., anywhere other than the unsealed pull tab. The plurality of adjacent tear slits should be slanted towards the unsealed pull tab. Upon peeling the label with the pull tab, the label can be removed in its entirety with the tear slits intact on the label.

The packages provide a means for indicating if the peelable/resealable tamper-evident label have been tampered with. The orientation of the tear slits, i.e., slanted towards the unsealed pull tab, indicate whether someone has attempted to improperly open the package. In some embodiments, a majority of the tear slits are slanted towards the unsealed pull tab. In other embodiments, the tear slits are substantially straight. For example, when the peelable/resealable tamper-evident label is lifted or pulled without the use of the unsealed pull tab, the label becomes self-destructive such that only a portion of the label will be torn away from the package without the label being removed in its entirety. But, when the unsealed pull tab is used as intended, the shape and orientation of the tear slits permit the peelable/resealable tamper-evident label to be removed in its entirety thereby opening the package. It should be understood that removal of the label in its entirety may include removing most of the label except for a portion of the label opposite the unsealed pull tab which may be affixed to the package. When the peelable/resealable tamper-evident label is removed in this manner, an exposed section of pressure sensitive adhesive on the face of the label may then be used to reclose the package.

The packages may include a monolayer film or a multilayer film for the package body depending upon the requirements of a particular packaging application. Film layers may include, but are not limited to oxygen barrier layers, moisture barrier layers, chemical barrier layers, abuse layers, tie or adhesive layers, bulk layers, and odor and oxygen scavenging layers. It is contemplated that the packages can be formed from many different materials such as, but not limited to, thermoplastics, papers, non-woven materials, metal foils and combinations thereof. In some preferred embodiments, the packages include oxygen barrier film and have an oxygen transmission rate ($O_2TR$) value of less than or equal to 10 $cm^3$/100 $in^2$/24 hours at 1 atmosphere, 23° C. and 0% RH.

The peelable/resealable tamper-evident label can be formed from any thermoplastic material including, but not limited to polyolefin polymers such as polyethylene, ethylene copolymers and polypropylene; polyamide, polyethylene terephthalates and combinations thereof. In some embodiments, the label may include an oxygen and/or moisture barrier material. The label utilizes an exposed area of pressure sensitive adhesive to peelably reseal to the package body. In some embodiments, the peelable/resealable tamper-evident label comprises at least a pattern-applied coating of pressure sensitive adhesive or a co-extensive layer of pressure sensitive adhesive. In some embodiments, the peelable/resealable tamper-evident label comprises a layer of pressure sensitive adhesive and an oxygen barrier layer. In other embodiments, the peelable/resealable tamper-evident label includes a layer of pressure sensitive adhesive and an abuse layer.

It is further contemplated that the line of weakness in the package body and the peelable/resealable tamper-evident label can be combined in various packaging configurations, including but not limited to bags, pouches, stand-up pouches, quad pouches, over-wraps, lidding film and rigid or semi-rigid thermoformed trays, vacuum packages, vacuum skin packaging and the like.

BRIEF DESCRIPTION OF THE DRAWINGS

Further features and advantages of the present invention will become apparent from the following detailed description, taken in combination with the appended drawings, in which:

FIG. 7a through 7d illustrate various label designs not of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
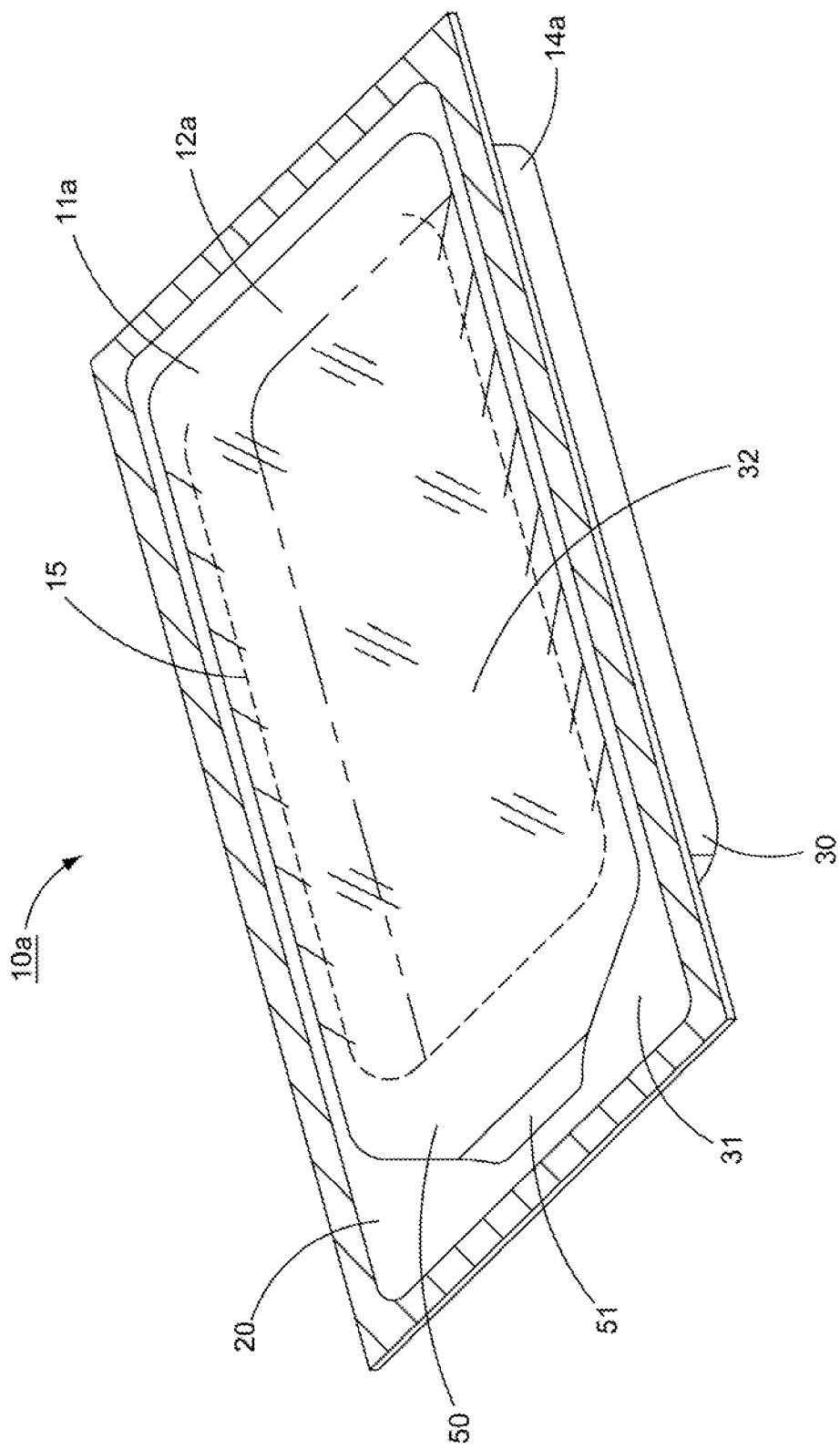
FIG. 1 illustrates a schematic view of one embodiment of a package in a "closed state".

One embodiment of the package 10a is illustrated in FIG. 1. Package 10a includes a package body 11a having a top portion 12a, a bottom portion 13a and side portions 14a connecting the bottom portion to the top portion. In this embodiment, the top portion 12a includes a lidding film 20, while the combined bottom portion 13a (not shown) and side portions 14a are in the form of a tray 30. Tray 30 may be of any shape desired, such as, for example, rectangular, square, and circular or polygon depending on both functional and aesthetic requirements. It will be appreciated that tray 30 is thermoformed to any depth as desired depending upon type and amount of food or non-food product to be packaged. It should also be appreciated that tray 30 may be configured to include two or more recessed areas (not shown) depending again on both functional and aesthetic requirements of a particular packaging application. In some preferred embodiments, tray 30 includes a sealing flange 31 extending around the periphery of a recessed cavity 32 to facilitate the sealing of a lidding film 20.

Figure 2:
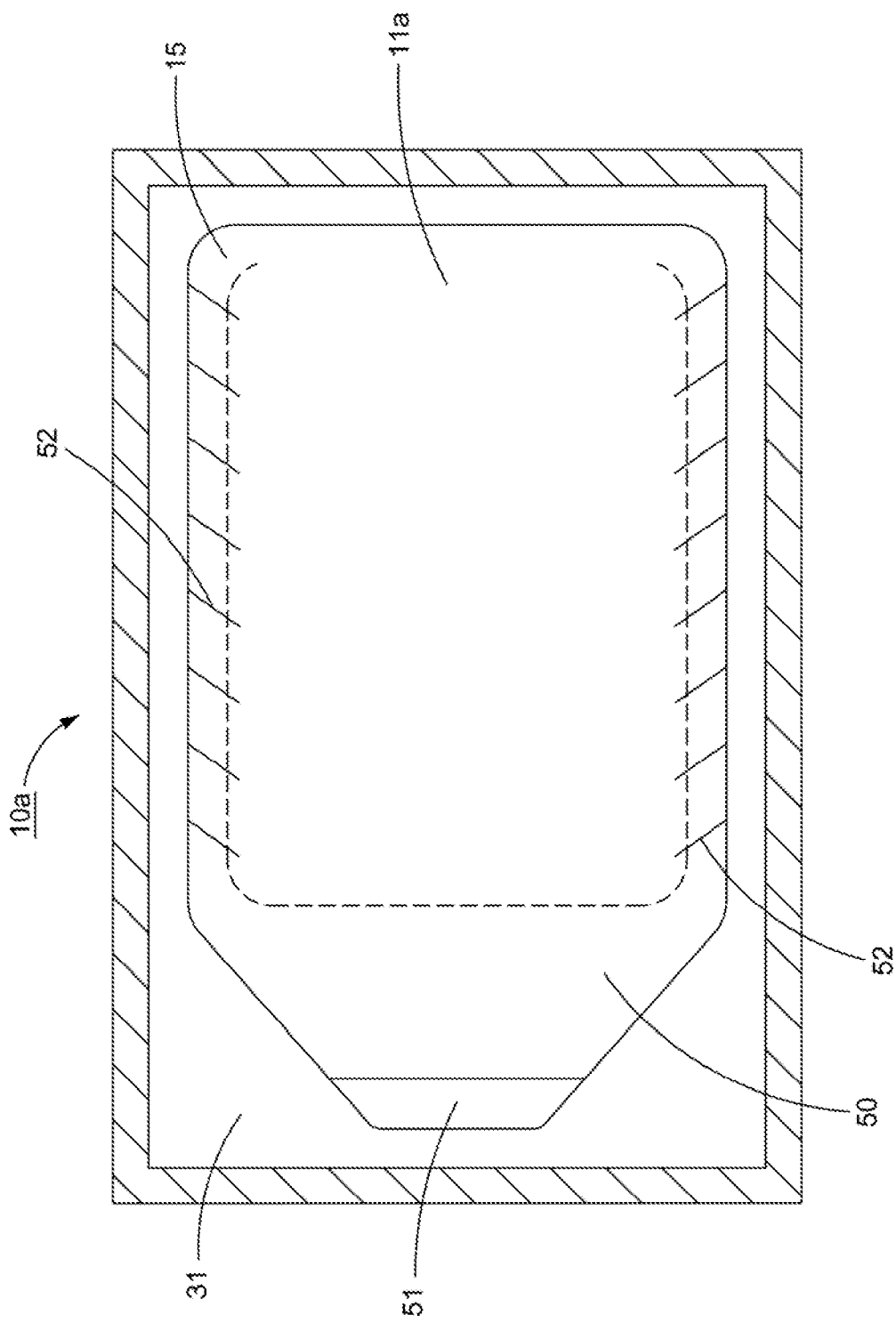
FIG. 2 illustrates a schematic top view of one embodiment of the package depicted in FIG. 1.

The package 10a also comprises a line of weakness 15 in a portion of the package body 11a. As is illustrated in this FIG. 1, package 10a is shown in the "closed state" with the portion of the package body 11a having the line weakness 15 intact. In this embodiment, the line of weakness 15 is a continuous perforation extending through the entire thickness of lidding film 20. In other embodiments, the perforations may not extend through the entire thickness of the lidding film 20. In other embodiments, the line of weakness 15 may include a series of intermittent perforations extending through the entire thickness and/or through less than the entire thickness of the lidding film. FIG. 2 is a top-down view of package 10a. In this embodiment, the line of weakness 15 has a rectangular shape. In other embodiments, line of weakness 15 may have any shape or pattern as desired including, but not limited to "V"-shaped, "U"-shaped, rectangular-shaped, square-shaped, circular-shaped and oval-shaped patterns. In some embodiments, when the peelable/resealable tamper-evident label 50 is peeled away from the package, the portion of the package body 11a having the line weakness 15 may be completely removed from the package. In other embodiments, the portion of the package body 11a having the line weakness 15 may fold backwards and remain attached to the package when the peelable/resealable tamper-evident label 50 is peeled away from the package. It should be understood that the term "line of weakness" refers to a line of perforations, cuts or the like in the packaging body material which may be continuous and/or intermittent. In some embodiments, the line of weakness extends through the entire thickness of the packaging body material. In other embodiments, the line of weakness extends through less than the entire thickness of the packaging body material.

Figure 3:
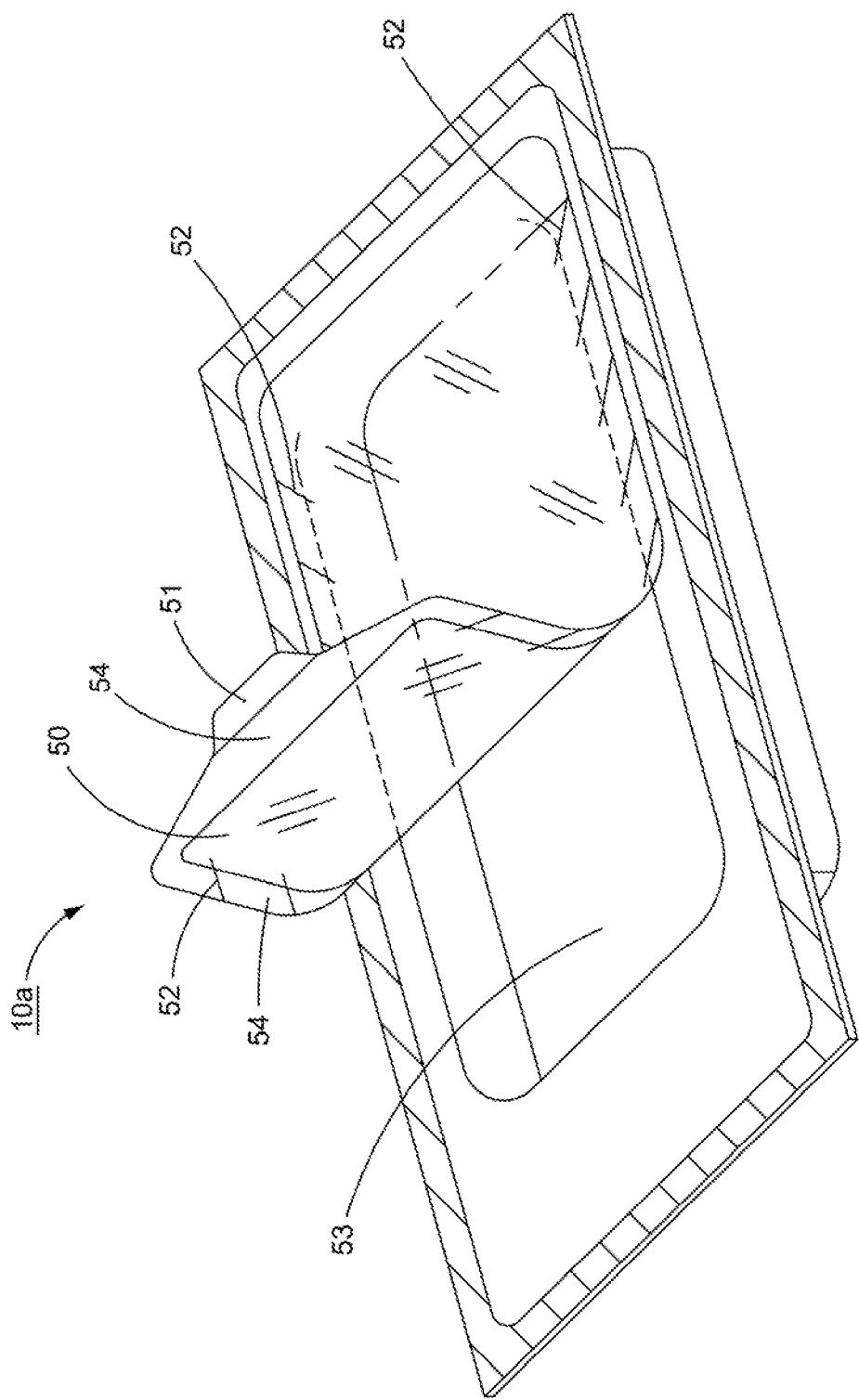
FIG. 3 illustrates a schematic view of one embodiment of the package depicted in FIG. 1 in an "open state".

Peelable/resealable tamper-evident label 50 is adhesively sealed to the portion of the package body 11a having the line of weakness 15 and includes an unsealed pull tab 51 and a plurality of adjacent substantially straight tear slits 52 arranged at or near the periphery of the label. In this embodiment, each of the adjacent substantially straight tear slits 52 terminates at the periphery of the peelable/resealable tamper-evident label. When the unsealed pull tab 51 is grasped and the label 50 is pulled away for the package, the portion of the package body 11a having the line weakness 15 ruptures to expose an access opening 53 as shown in FIG. 3. In this embodiment, the size of label 50 is larger than the area define by the line of weakness 15. When label 50 is peeled away, the face of the label has an area of exposed pressure sensitive adhesive 54 around its margin. This exposed area of adhesive 54 permits label 50 to reseal to the package and close opening 53.

Figure 4:
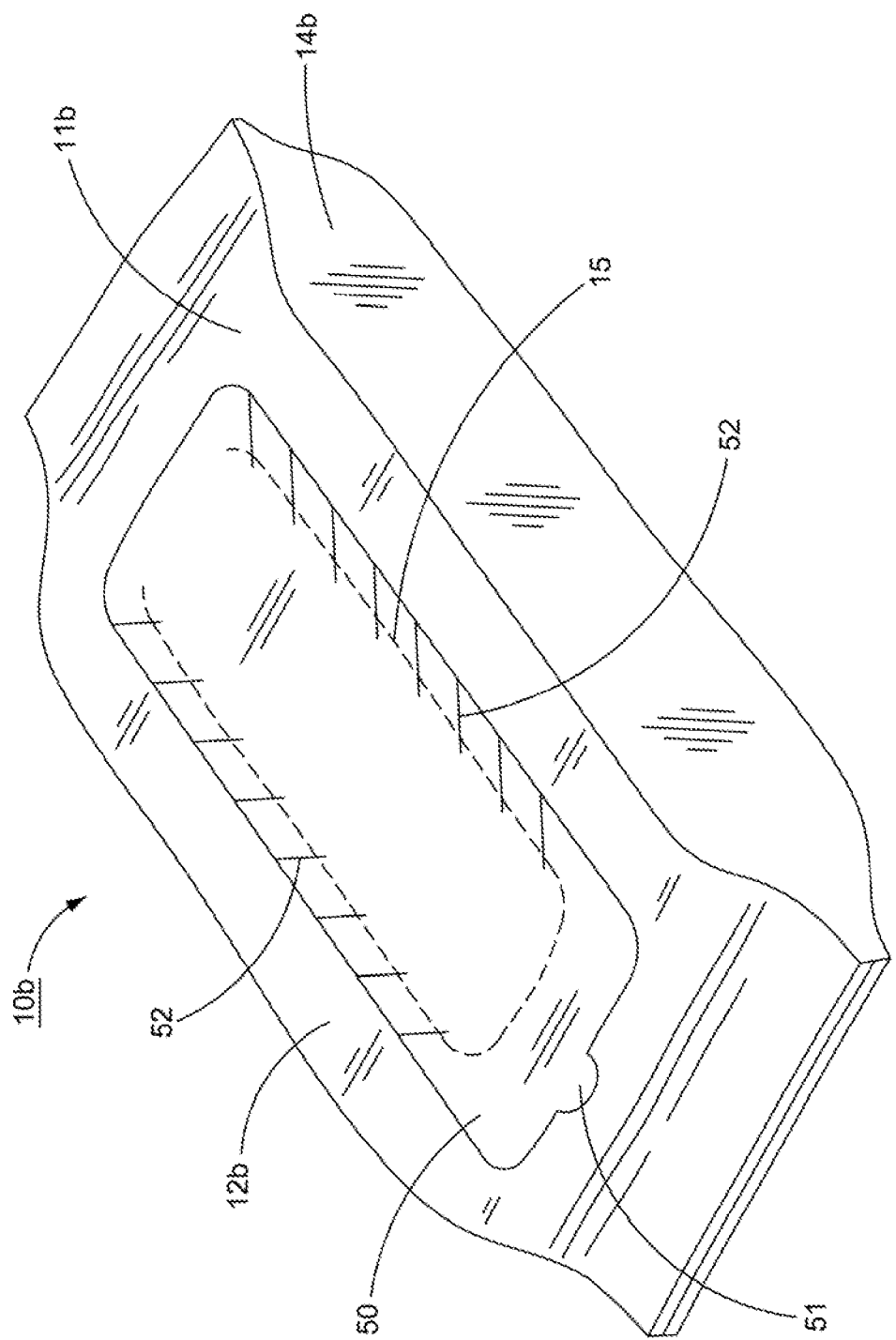
FIG. 4 illustrates a schematic view of another embodiment of a package in a "closed state".

FIG. 4 illustrates another embodiment of package 10b configured as a pouch in its "closed state". Package 10b comprises a package body 11b having a top portion 12b, a bottom portion 13b (not shown) and side portions 14b connecting the bottom portion to the top portion. In this embodiment, the top portion 12b, a bottom portion 13b and side portions 14b are formed from a single packaging film. In this embodiment, package 10b includes a line of weakness 15 is a continuous perforation extending through the entire thickness of the package body 11b. The package 10b also includes a peelable/resealable tamper-evident label 50 with an unsealed pull tab 51 and a plurality of adjacent substantially straight tear slits 52 as described above for package 10a.

Figure 5:
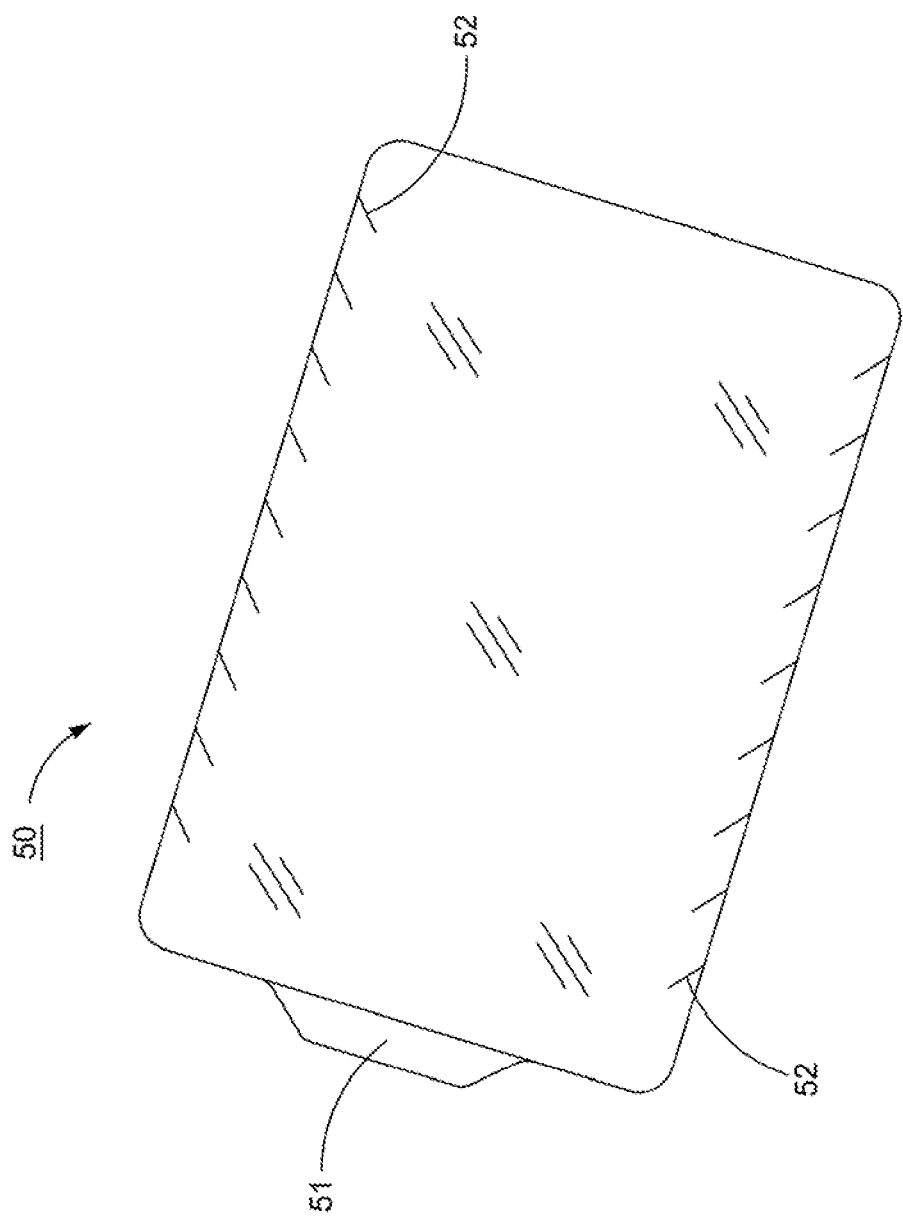
FIG. 5 illustrates a schematic view of one embodiment of a label for use with a package.

Turning now to FIG. 5, there is shown a close-up view of an embodiment of a peelable/resealable tamper-evident label 50. The overall size and shape of label 50 can vary depending upon the overall size and shape of the package. While label 50 is shown as having a rectangular shape in FIG. 5, it should be understood that peelable/resealable tamper-evident label may be of any shape. As depicted, the plurality of adjacent substantially straight tear slits 52 are arranged at or near the periphery of peelable/resealable tamper-evident label 50. Each tear slit is substantially straight and is slanted towards the unsealed pull tab 51. In some embodiments, the angle of slant relative to the nearest peripheral edge of the label can vary within a range from 5 to 85 degrees, from 10 to 45 degrees, from 15 to 40 degrees, or from 20 to 35 degrees. The length of each tear slit can also vary to any desired distance. For maximum benefit, each tear slit has a length within a range from 0.5 mm to 50 mm, from 1 mm to 10 mm, or from 1 mm to 5 mm. In order for the label to be removed in its entity with the tear slits unbroken on the label, adjacent tear slits should be spaced apart by a distance within a range from 0.5 mm to 50 mm or 5 mm to 10 mm. It should be understood that the term "tear slit" is intended to encompass a perforation, cut or score-line in the peelable/resealable tamper-evident label which may have any width.

In some embodiments, the depth of each tear slit may extend through the entire thickness of the peelable/resealable tamper-evident label. In other embodiments, the depth of each tear slit may extend through less than the entire thickness of the peelable/resealable tamper-evident label.

Figure 6:
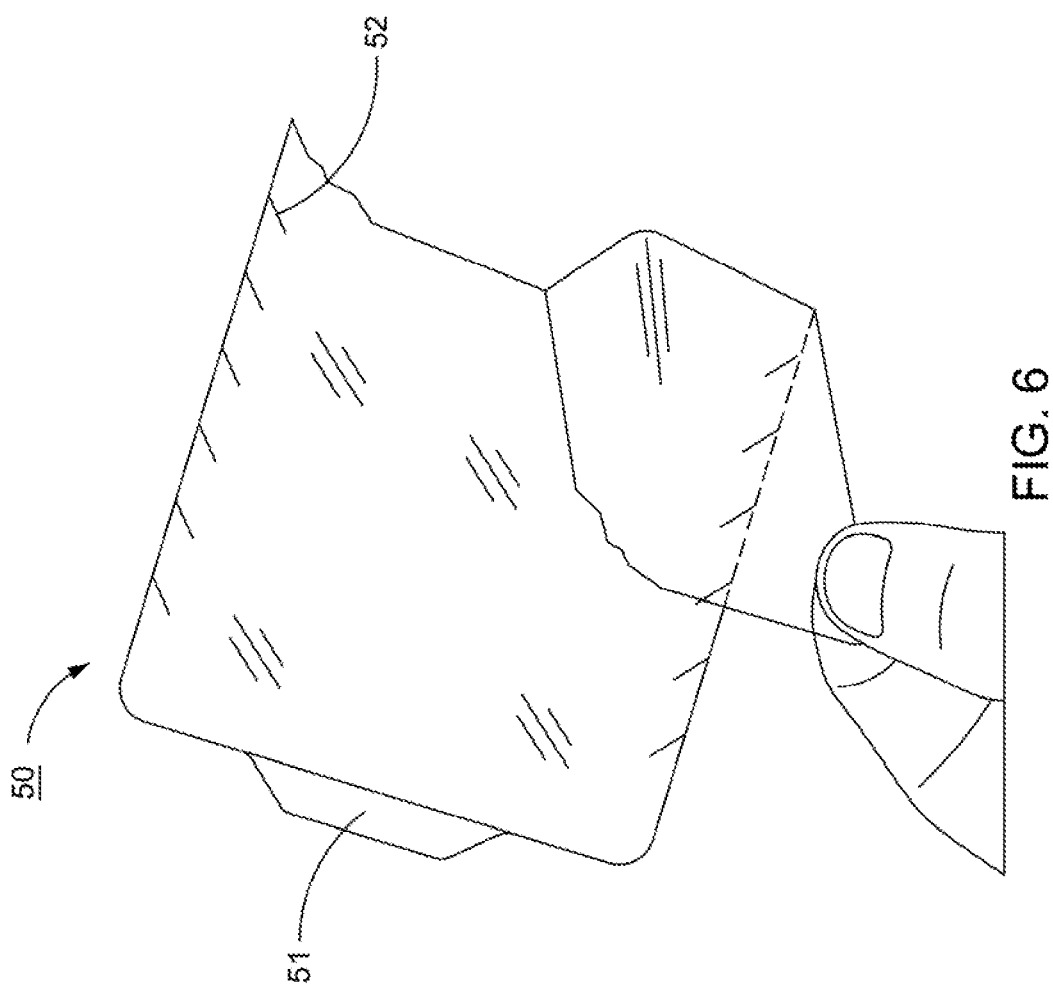
FIG. 6 illustrates a schematic view of the embodiment of a label in FIG. 5 in a "self-destructive state".

The geometry and orientation of the tear slits in the label are important in terms of how the label can be removed in its entirety when properly removed with the unsealed pull tab as illustrated in FIG. 3. These aspects also provide evidence of tampering when one improperly attempts to remove the label at a corner or a side of the label. When the label is lifted anywhere other than the unsealed pull tab, it will tear at one or more tear slits, i.e., becomes "self-destructive" which indicates that the label has been tampered with as illustrated in FIG. 6.

Figure 7D:
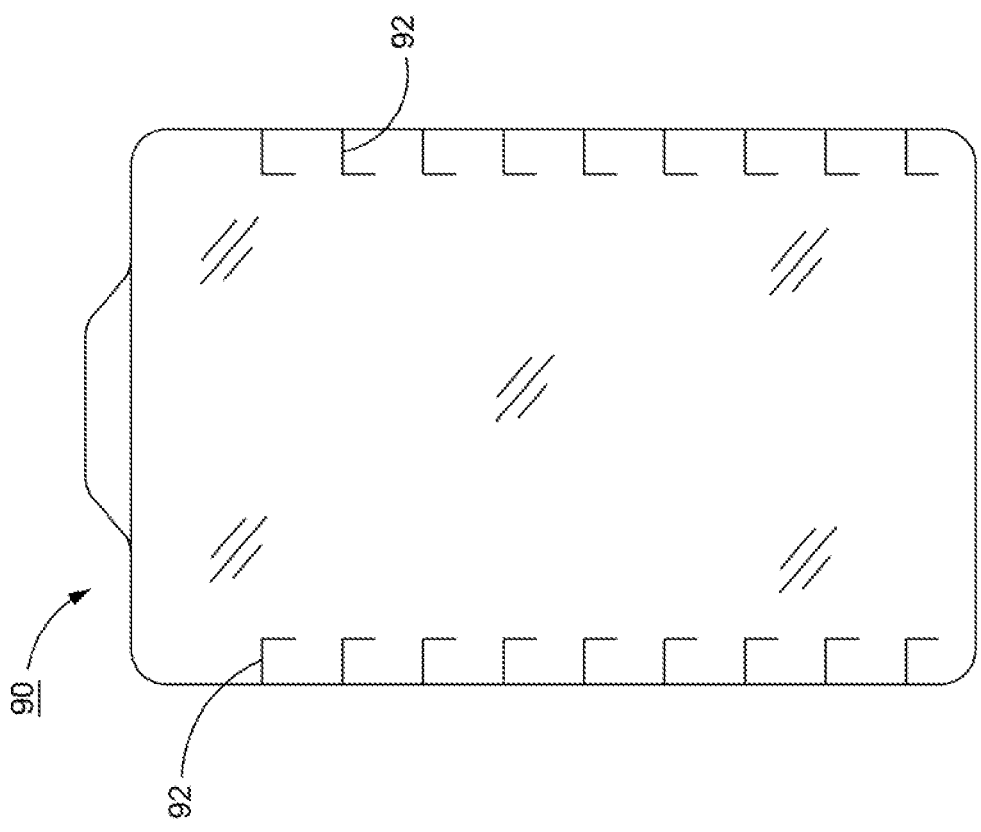
Figure 7C:
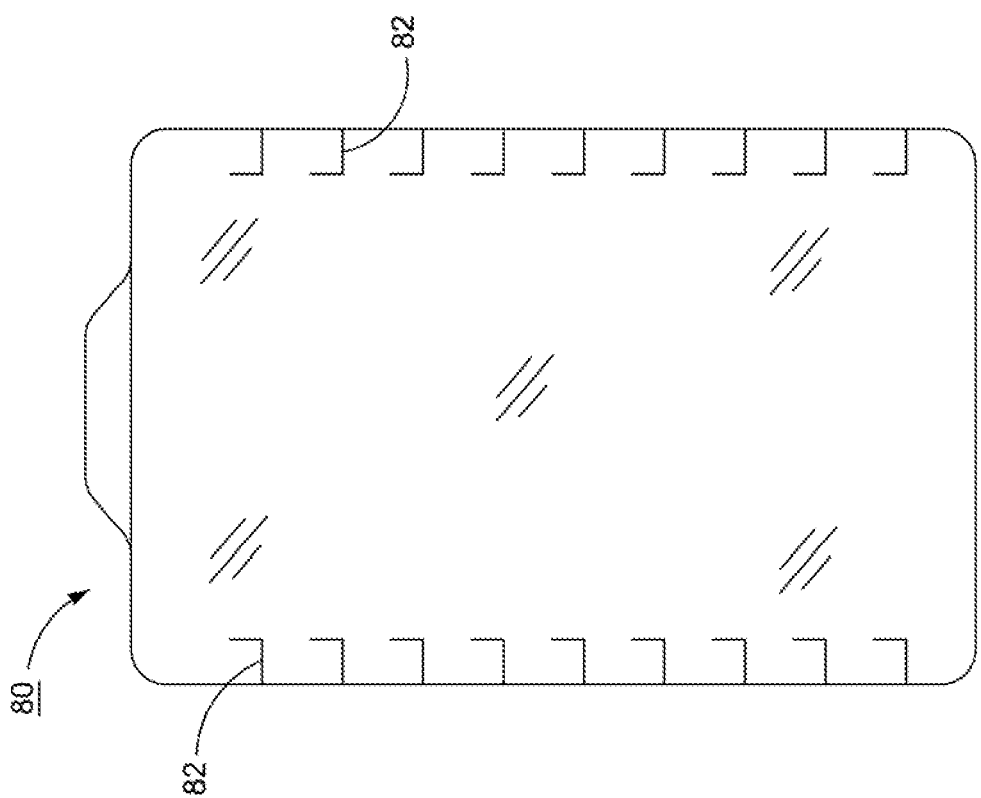

FIGS. 7a, 7b, 7c and 7d illustrate four comparative sets of tear slits which are not of the present invention. In FIG. 7a, label 60 is shown having substantially straight tear slits 62 which are not slanted towards the towards the unsealed pull tab 51. FIG. 7b illustrates label 70 having tear slits 72 with a "T-shaped" geometry which are also not slanted towards tab 51. FIGS. 7c and 7d depict labels 80 and 90 each having tear slits with an "L-shaped" geometry, 82 and 92, respectively. The shorter line segment of the "L-shaped" geometry of slits 82 of label 80 are oriented towards tab 51, while those of slits 92 of label 90 are oriented away from tab 51. To demonstrate the importance of the tear slit geometry and its orientation relative to pull tab 51, tests were performed on labels 50 (shown in FIGS. 1-6), 60, 70, 80 and 90. Labels were fabricated by cutting a 4 inch by 6 inch specimen from an oriented polypropylene film coated on one face with a pressure sensitive adhesive. Tear slits having a length within a range from 2 to 4 mm were cut into to the sides of each label as depicted in FIGS. 5, and 7a-7d. Before testing, the label was affixed to a smooth rubber surface by manual pressure. Test #1 determined whether the label tears across the label when lifted anywhere other than the unsealed pull tab. This test was performed by peeling a portion the lower corner of the label opposite the unsealed pull tab 51 and pulling the label towards the unsealed pull tab 51. A positive result ("+") was indicated when the label tore without the label being removed intact, i.e., becomes self-destructive. A negative result ("−") was indicated when the label was removed in its entirety with the tear slits intact. Test #2 determined whether the label can be removed in its entirety with the tear slits intact when peeled by the unsealed pull tab. A positive result ("+") was indicated when label was removed intact with tear slits unbroken. A negative result ("−") was indicated when the label tore without the label being removed intact. Each label design was tested in triplicate for each test. The results of both tests for each label 50, 60, 70, 80 and 90 are reported below in TABLE 1.

TABLE 1

|    | Test 1 | Test 2 |
|----|--------|--------|
| 50 | +      | +      |
| 60 | +      | −      |
| 70 | +      | −      |
| 80 | +      | −      |
| 90 | +      | −      |

As was demonstrated, label 50 having substantially straight tear slits slanted towards the unsealed pull tab 51 is completely tamper-evident compared to the other label designs.

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A package comprising:
    a package body having a top portion, a bottom portion and side portions connecting the bottom portion to the top portion;
    a portion of the package body having a line of weakness therein;
    a peelable/resealable tamper-evident label adhesively sealed to the portion of the package body having the line of weakness;
    wherein the label comprises an unsealed pull tab and a plurality of adjacent tear slits positioned at or near the periphery of the label, wherein the tear slits are slanted towards the unsealed pull tab, and
    upon peeling the label with the pull tab, the label can be removed in its entirety with the tear slits intact on the label.

2. The package according to claim 1, wherein the top portion of the package body comprises a lidding film and the bottom portion and side portions of the package body comprise a thermoformed tray.

3. The package according to claim 1, wherein the package is configured as an over-wrap.

4. The package according to claim 1, wherein the package is configured as a pouch.

5. The package according to claim 1, wherein upon lifting or pulling the label without the use of the unsealed pull tab, a portion of the label is torn away without the label being removed in its entirety with the tear slits intact on the label.

6. The package according to claim 1, wherein each tear slit is separated from an adjacent tear slit by a distance within a range from 0.5 mm to 50 mm.

7. The package according to claim 1, wherein each tear slit is separated from an adjacent tear slit by a distance within a range from 5 mm to 10 mm.

8. The package according to claim 1, wherein each tear slit has a length within a range from 0.5 mm to 50 mm.

9. The package according to claim 1, wherein each tear slit has a length within a range from 1 mm to 10 mm.

10. The package according to claim 1, wherein each tear slit has a length within a range from 1 mm to 5 mm.

11. The package according to claim 1, wherein the label comprises a multilayer film.

12. The package according to claim 1, wherein the label encompasses an area greater than the area defined by the portion of the package portion having the line of weakness.

13. The package according to claim 1, wherein the line of weakness comprises a continuous perforation extending through the entire thickness of the package body.

14. The package according to claim 1, wherein a majority of the tear slits are slanted towards the unsealed pull tab.

* * * * *

UNITED STATES PATENT AND TRADEMARK OFFICE
CERTIFICATE OF CORRECTION

PATENT NO. : 11,383,908 B2
APPLICATION NO. : 16/339637
DATED : July 12, 2022
INVENTOR(S) : Reinaldo Caleman It is certified that error appears in the above-identified patent and that said Letters Patent is hereby corrected as shown below:

In the Specification

Column 2, Line 20: Delete "mariner" and insert -- manner --, therefor.

Column 2, Line 22: Delete "recluse" and insert -- reclose --, therefor.

Column 3, Line 50: After "15", insert -- "," --, therefor.

Signed and Sealed this
Eighteenth Day of July, 2023

Katherine Kelly Vidal
*Director of the United States Patent and Trademark Office*